(12) United States Patent
Ip et al.

(10) Patent No.: US 8,411,986 B2
(45) Date of Patent: Apr. 2, 2013

(54) SYSTEMS AND METHODS FOR SEGMENATION BY REMOVAL OF MONOCHROMATIC BACKGROUND WITH LIMITIED INTENSITY VARIATIONS

(75) Inventors: Katharine Ip, San Francisco, CA (US); Robinson Piramuthu, Oakland, CA (US); Paul King, San Francisco, CA (US)

(73) Assignee: FlashFoto, Inc., Los Gatos, CA (US)

( * ) Notice: Subject to any disclaimer, the term of this patent is extended or adjusted under 35 U.S.C. 154(b) by 193 days.

(21) Appl. No.: 12/798,917

(22) Filed: Apr. 13, 2010

(65) Prior Publication Data

US 2010/0316288 A1 Dec. 16, 2010

Related U.S. Application Data

(60) Provisional application No. 61/168,619, filed on Apr. 13, 2009.

(51) Int. Cl.
G06K 9/34 (2006.01)
G06K 9/40 (2006.01)
G06K 9/48 (2006.01)

(52) U.S. Cl. .......................... 382/266; 382/173; 382/199

(58) Field of Classification Search .................. 382/199, 382/203, 190, 195, 173, 177, 181, 266, 273
See application file for complete search history.

(56) References Cited

U.S. PATENT DOCUMENTS

| | | | | |
|---|---|---|---|---|
| 5,881,171 A | * | 3/1999 | Kinjo | 382/199 |
| 5,930,391 A | * | 7/1999 | Kinjo | 382/173 |
| 6,021,221 A | * | 2/2000 | Takaha | 382/199 |
| 6,549,646 B1 | * | 4/2003 | Yeh et al. | 382/132 |
| 6,650,778 B1 | * | 11/2003 | Matsugu et al. | 382/209 |
| 7,162,082 B2 | * | 1/2007 | Edwards | 382/173 |
| 7,352,900 B2 | * | 4/2008 | Yamaguchi et al. | 382/192 |
| 7,391,906 B2 | * | 6/2008 | Blake et al. | 382/199 |
| 7,526,131 B2 | * | 4/2009 | Weber | 382/199 |
| 7,613,355 B2 | * | 11/2009 | Hirano | 382/266 |
| 7,738,725 B2 | * | 6/2010 | Raskar et al. | 382/266 |
| 7,822,272 B2 | * | 10/2010 | Lei | 382/168 |
| 2002/0071131 A1 | * | 6/2002 | Nishida | 358/1.9 |
| 2003/0103682 A1 | * | 6/2003 | Blake et al. | 382/282 |
| 2004/0131236 A1 | * | 7/2004 | Chen et al. | 382/118 |
| 2004/0179233 A1 | * | 9/2004 | Vallomy | 358/1.15 |
| 2004/0212725 A1 | * | 10/2004 | Raskar | 348/370 |
| 2005/0008248 A1 | * | 1/2005 | Wang | 382/260 |
| 2006/0251322 A1 | * | 11/2006 | Palum et al. | 382/167 |
| 2007/0189615 A1 | * | 8/2007 | Liu et al. | 382/232 |
| 2008/0089609 A1 | * | 4/2008 | Perlmutter et al. | 382/284 |
| 2008/0137979 A1 | * | 6/2008 | Perlmutter et al. | 382/255 |
| 2008/0292194 A1 | * | 11/2008 | Schmidt et al. | 382/217 |
| 2009/0060297 A1 | * | 3/2009 | Penn et al. | 382/128 |
| 2010/0232685 A1 | * | 9/2010 | Yokokawa et al. | 382/159 |

\* cited by examiner

*Primary Examiner* — Wenpeng Chen
*Assistant Examiner* — Feng Niu

(57) ABSTRACT

A method for distinguishing a foreground object from a monochromatic background in a digital image depicting a foreground object in front of said monochromatic background. A outer edge intensity map is created of the foreground object to which a tracing process is conducted. A continuous edge map is created by utilizing the traced edges in the outer edge intensity map. By selecting a path on the continuous edge map based on average edge intensity, a final edge map is created. The pixels comprised within the final edge map are distinguished as the foreground object. Optionally, the final edge map may be refined utilizing certain techniques.

20 Claims, 21 Drawing Sheets

500

501

502

503

800

801

SYSTEMS AND METHODS FOR SEGMENATION BY REMOVAL OF MONOCHROMATIC BACKGROUND WITH LIMITIED INTENSITY VARIATIONS

CROSS REFERENCE TO RELATED APPLICATION

This application claims priority to U.S. provisional patent Application No. 61/168,619, filed Apr. 13, 2009, which is hereby incorporated by reference herein in its entirety.

BACKGROUND

Though many try to create methods for enabling a computer to accurately determine the foreground of an image, a method that performs such a task is elusive. There have been a few that have come up with solutions (See e.g., Yu and Shi, "Object-Specific Figure-Ground Segmentation", 2003 IEEE Computer Society Conference on Computer Vision and Pattern Recognition, Proceedings, Volume 2, pages 39-45, which is hereby incorporated by reference herein in its entirety), but those solutions aren't broad enough to solve the general problem of creating a system or method which would run effectively on any image. Even with advancements in artificial intelligence, satisfactory solutions for having a computer automatically determine the "figure" and "ground," according to the definitions in psychology literature or as defined by Gestalt rules of perception, remain undiscovered. The application of encoding human perception into machine readable code has proved difficult.

One method for having a computer represent its results for determining the foreground of an image is to direct the computer to segment out the foreground from an image. With the advancement and cost effectiveness of digital photography, many more digital images are being created than ever before. Many of these newly created digital images are taken of a person or people, whereby the person or people are arguably in the foreground of the image. Person or people segmentation from an entire image is currently a popular research topic in the field of computer vision.

Most of the segmentation approaches rely heavily on training sets and accuracy of probabilistic models. Such approaches have the drawback of being computationally demanding and memory intensive. They are also sensitive to model mismatch since they are based heavily on assumptions. Some examples of model based approaches are: (1) "Efficient matching of pictorial structures," P. F. Felzenszwalb, D. P. Huttenlocher, Proceedings of the IEEE Conference on Computer Vision and Pattern Recognition, vol. 2, pp. 66-73, 2000; (2) "Probabilistic methods for finding people," S. Ioffe, D. A. Forsyth, International Journal of Computer Vision, vol. 43, issue 1, pp. 45-68, 2001; (3) "Simultaneous detection and segmentation of pedestrians using top-down and bottom-up processing,"V. Sharma, J. W. Davis, Proceedings of the IEEE Conference on Computer Vision and Pattern Recognition, pp. 1-8, June 2007; (4) "Bottom up recognition and parsing of the human body," P. Srinivasan, J. Shi, Proceedings of the IEEE Conference on Computer Vision and Pattern Recognition, pp. 1-8, June 2007; and (5) "Detecting and segmenting humans in crowded scenes," M. D. Rodriguez, M. Shah, Proceedings of the $15^{th}$ International Conference on Multimedia, pp. 353-356, 2007. Some segmentation approaches rely on rule based systems. Such systems are more forgiving to assumption mismatches than model-based systems. An example of a rule based approach is proposed in Patent Cooperation Treaty Patent Application No. PCT/US2008/013674 entitled "Systems and Methods for Rule-Based Segmentation for Vertical Person or People with Full or Partial Frontal View in Color Images," filed Dec. 12, 2008.

However, neither approach successfully segments an image of a person within an image whose clothing and background are similar in color. The systems and methods disclosed in the descriptions below provide solutions for segmentation by removal of a monochromatic background with limited intensity variations.

SUMMARY

The present embodiments overcome the prior art inability to segment by removal of a monochromatic background with limited intensity variations. In one embodiment the systems and methods comprise distinguishing a foreground object from a monochromatic background in a digital image depicting a foreground object in front of the monochromatic background by creating an outer edge intensity map of the foreground object, tracing edges in the outer edge intensity map, utilizing the traced edges in the outer edge intensity map to create a continuous edge map, selecting a path on the continuous edge map based upon some criteria to create a final edge map, and distinguishing as the foreground object each pixel comprised within the final edge map, and optionally including the final edge map.

In an alternative embodiment, the systems and methods comprise creating a distinction between the pixels of the background from the foreground by optionally centering the subject of the image, optionally cropping the image to include the desired background and foreground of the image, creating a preliminary distinction utilizing edge based processes, and refining the preliminary distinction utilizing one or more refinement techniques. One example of a process for illustrating the distinction includes creating a mask.

In another embodiment, the systems and methods comprise creating a preliminary figure mask from an image with a monochromatic background and the figure of the image in front of the background by generating an outer edge intensity map of the figure, tracing the edges of the outer edge intensity map to create a continuous edge map, forming an edge mask, and filling the edge mask with pixel values.

In another alternative embodiment, the systems and methods comprise one or more refinement techniques for refining the preliminary distinction. For example, one refinement technique will correct missing pixel regions such as missing arms or arm pixel regions. Another example of a refinement technique includes filling divots found in the preliminary distinction or mask, or an intermediate distinction or mask. Another alternative example of a refinement technique includes refining the boundaries of the distinction or mask.

BRIEF DESCRIPTION OF DRAWINGS

The accompanying drawings, which are included as part of the present specification, illustrate the presently preferred embodiments and together with the general description given above and the detailed description of the preferred embodiments given below serve to explain and teach the principles of the present invention.

DETAILED DESCRIPTION

Figure 1:
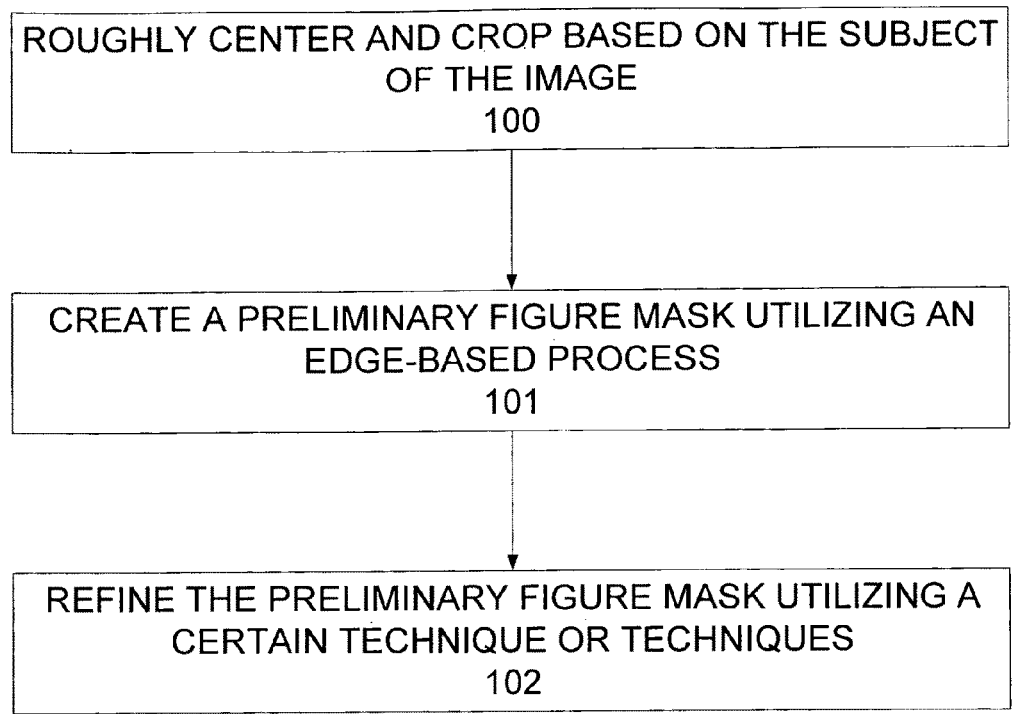
FIG. 1 is a diagrammatic illustration of a system, process or method for segmentation by removal of monochromatic background with limited intensity variations, according to one embodiment of the present invention.

Systems and methods for segmentation by removal of monochromatic background with limited intensity variations.

In the following description, for purposes of explanation, specific nomenclature is set forth to provide a thorough understanding of the various inventive concepts disclosed herein. However it will be apparent to one skilled in the art that these specific details are not required in order to practice the various inventive concepts disclosed herein.

Some portions of the detailed description that follow are presented in terms of processes and symbolic representations of operations on data bits within computer memory. These process descriptions and representations are the means used by those skilled in the data processing arts to most effectively convey the substance of their work to others skilled in the art. A process is here, and generally, conceived to be a self-consistent sequence of sub-processes leading to a desired result. These sub-processes are those requiring physical manipulations of physical quantities.

The physical quantities manipulated by sub-processes usually, though not necessarily, take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk, including floppy disks, optical disks, CD-ROMS, and magnetic-optical disks, read-only memories ("ROMs"), random access memories ("RAMs"), EPROMs, EEPROMs, magnetic or optical cards, or any type of media suitable for storing electronic instructions, and each coupled to a computer system bus.

The processes and, displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the inventions as described herein.

The invention involves the manipulation of images, which in some embodiments are stored as bitmapped or pixmapped images or other data formats. As used herein, a bitmap or pixmap is a type of memory organization or image file format used to store digital images. Images may be compressed or stored in alternative formats, such as vector images. Examples of image formats include, but are not limited to, Windows bitmap, JPEG, TIFF, PNG, and GIF. More disclosure on bitmap images is found in Foley, 1995, Computer Graphics: Principles and Practice, Addison-Wesley Professional, p. 13, ISBN 0201848406 as well as Pachghare, 2005, Comprehensive Computer Graphics: Including C++, Laxmi Publications, p. 93, ISBN 8170081858, each of which is hereby incorporated by reference herein in its entirety. While images may be stored in a variety of formats, processes described herein are described as transformations on images in an uncompressed state.

In a typical uncompressed bitmap, the pixel intensity of each color band is stored as a memory unit such as a byte. An RGB image would therefore have three bytes for every color pixel. High dynamic range images may have multiple bytes per color band. An alpha channel, for transparency, may also be stored as a bitmap, either as a fourth channel or a separate file.

Some embodiments disclosed below create a mask, often stored as an alpha channel. In computer graphics, when a given image or portion of an image (or figure) is intended to be placed over another image (or background), the transparent areas can be specified through a binary mask. For each intended composite image there are three bitmaps: the image containing the figure, the background image and an additional mask, in which the figure areas are given a pixel value of all bits set to 1's and the surrounding areas a value of all bits set to 0's. The mask may be nonbinary when blending occurs between the figure and its surroundings.

To put the figure image over the background, the program may first mask out the ground pixels in the figure image with the binary mask by taking a pixel by pixel product of the two bitmaps. This preserves the figure pixels. Another product is performed between the inverse of the binary mask and the background, removing the area where the figure will be placed. Then, the program may render the final image pixels by adding the two product results. This way, the figure pixels are appropriately placed while preserving the background. The result is a compound of the figure over the background. Other blending techniques may be used to blend the figure with the new background, such as smoothing at the figure mask boundary.

Figure mask may be produced by segmenting the figure region from the background. In computer vision, segmentation refers to the process of partitioning a digital image into multiple regions. The pixels in a region share similar characteristics or computed properties. They may be similar in color and intensity, or be part of a larger texture or object. Adjacent regions are significantly different with respect to the same characteristic(s).

Several general-purpose algorithms and techniques have been developed for segmenting images into regions based on pixel characteristics, such as watershed and mean-shift. Exemplary segmentation techniques are disclosed in *The Image Processing Handbook*, Fourth Edition, 2002, CRC Press LLC, Boca Raton, Fla., Chapter 6, which is hereby incorporated by reference herein for such purpose.

FIG. 1 is a diagrammatic illustration of a system, process or method for segmentation by removal of monochromatic background with limited intensity variations, according to one embodiment of the present invention. All steps or tasks will be described using this one embodiment. However, it will be apparent to one of skill in the art, that the order of the steps described could change in certain areas, and that the embodiment is used for illustrative purposes and for the purpose of providing understanding of the inventive properties of the invention. Further, though the description using this one embodiment utilizes removal of a white background (or white screen), it will be apparent to one of skill in the art that a background of any color (i.e. an image with the subject or figure in front of a monochromatic screen or wall with limited intensity variation) may be removed. The removal of a white colored background is used for illustrative purposes, for the purpose of providing understanding of the inventive properties of the invention, and should in no way limit the scope of the disclosed invention. In addition, though certain embodiments disclosed herein utilize a mask, it will be apparent to one of skill in the art that any system, method, apparatus, technique, or other process may be utilized to distinguish (or provide a distinction of) a certain subset of pixels within an image from another subset or subsets of pixels within that image. The utilization of a mask in the description of this one embodiment is used for illustrative purposes, for the purpose of providing understanding of the inventive properties of the invention, and should in no way limit the scope of the disclosed invention. Generally, in the embodiment described in FIG. 1, an image is: optionally centered and cropped roughly based on the subject to remove any background outside of the scope of segmentation at 100; a preliminary figure mask is created from the image utilizing an edge-based process at 101; and, the preliminary figure mask is refined utilizing a certain technique or techniques at 102.

Figure 2:
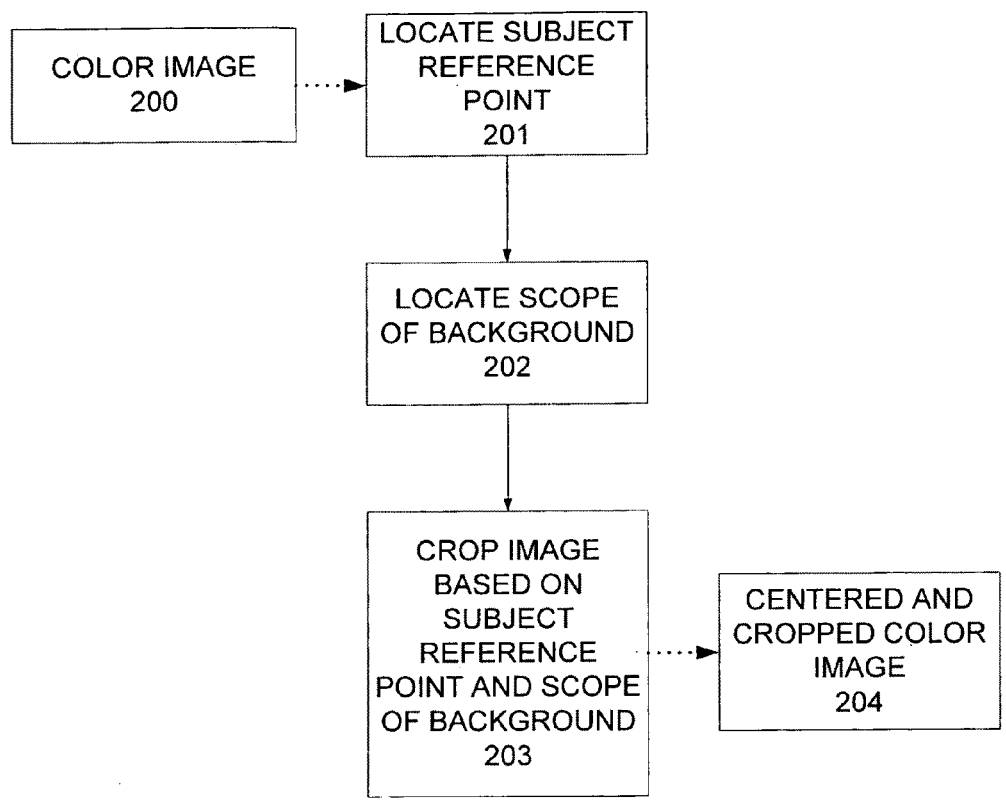
FIG. 2 is a diagrammatic illustration of an embodiment for roughly centering and cropping an image based on the subject to remove any background outside of the scope of person segmentation.

As stated above, the FIG. 1 embodiment may first optionally process a rough center and crop of an image based on the subject to remove any background outside of the scope of segmentation, as illustrated diagrammatically at 100. FIG. 2 is a diagrammatic illustration of an embodiment for roughly centering and cropping an image based on the subject to remove any background outside of the scope of person segmentation. The rough center and crop operation set forth above can comprise any conventional type of rough center and crop operation, such as in the manner set forth in the diagrammatic illustration of the process in FIG. 2. It will be apparent to one of skill in the art that some images will not need to be roughly centered and cropped due to being provided as already roughly centered and cropped.

Figure 3:
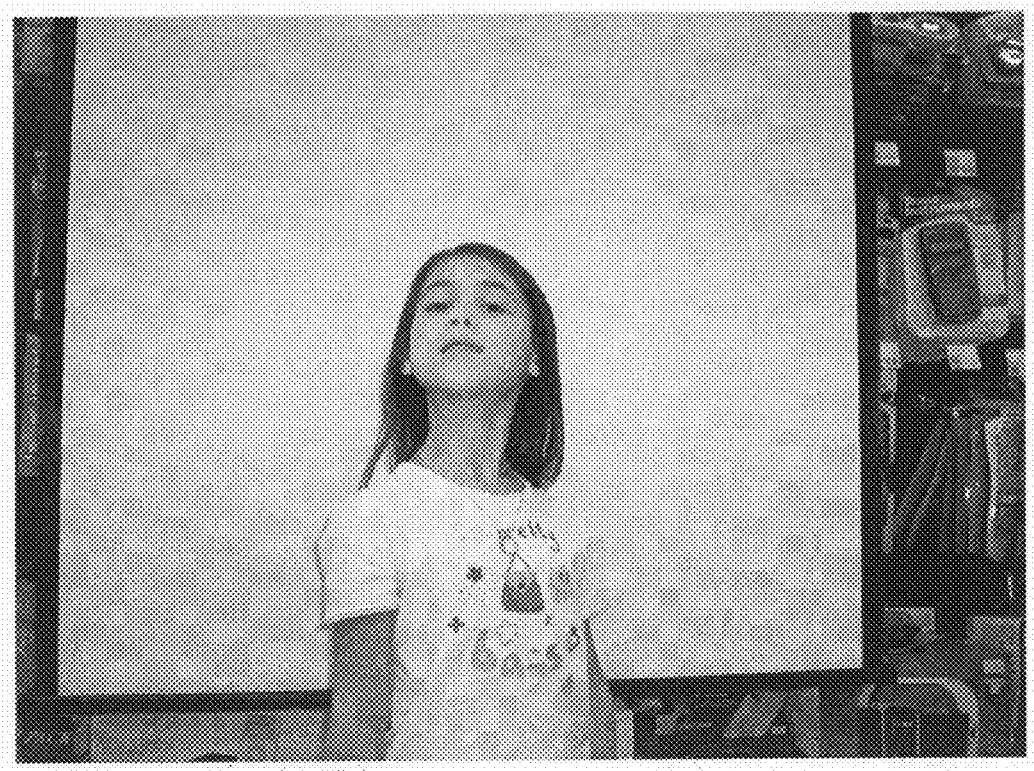
FIG. 3 is a sample color image presented in gray scale utilized to illustrate the processes and sub-processes of the exemplary embodiment diagrammatically illustrated in FIG. 2.
Figure 4:
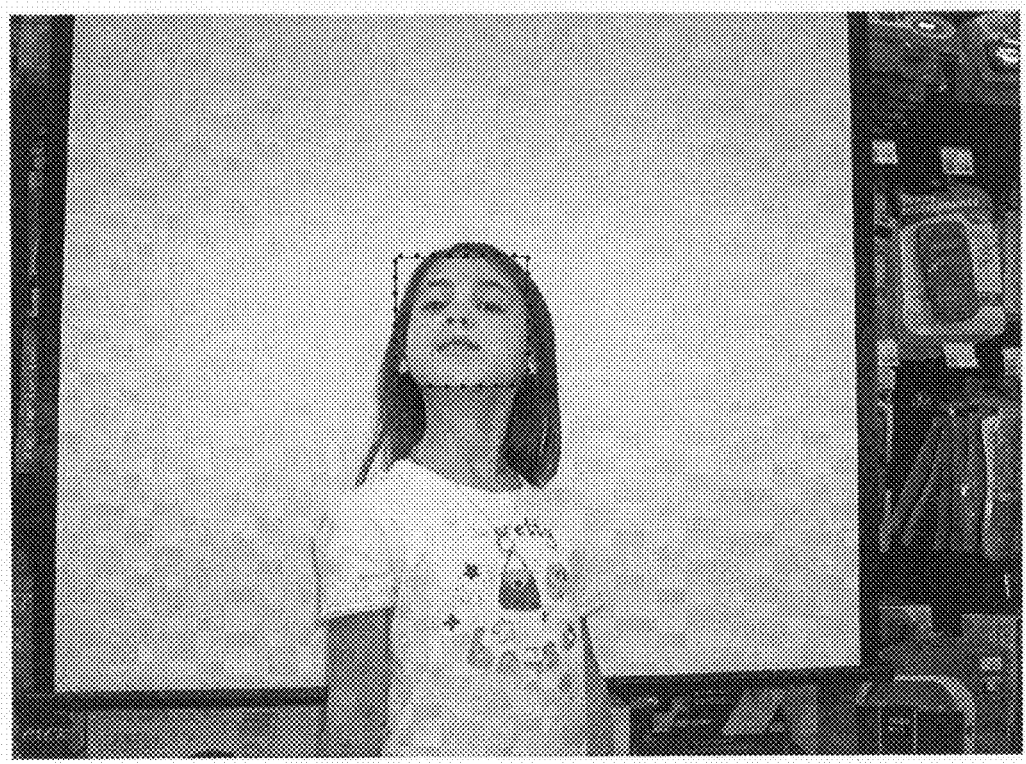
FIG. 4 is the sample color image presented in gray scale of FIG. 3 with the reference area designated with by a surrounding dotted box.

In FIG. 2, the color image desired to be centered and cropped is selected at 200. FIG. 3 is a sample color image presented in gray scale utilized to illustrate the processes and sub-processes of the exemplary embodiment diagrammatically illustrated in FIG. 2. FIG. 3 is a color image of a young girl with a white shirt standing in front of a white screen, though it may be noted that the intensity of the color white in the shirt and the intensity of the color white in the screen are distinguishable but similar. At 201, the subject's reference point is located. The subject's reference point is utilized for centering of the image based on the reference point. As should be apparent, any number of points or areas of an image can be selected as a reference location. In the sample image of FIG. 3, the reference area may be the young girl's face. FIG. 4 is the sample color image presented in gray scale of FIG. 3 with the reference area designated with by a surrounding dotted box.

The selection of the subject's reference location operation can comprise any conventional type of selection operation, such as manually selecting the reference point with the assistance of a computer or utilizing an autonomous or semi-autonomous process. As illustrated in FIG. 4, the young girl's face was selected as the reference point. The selection of a person's face as the reference point in an image operation can comprise any conventional type of selection operation, such as manually selecting the person's face with the assistance of a computer, utilizing a face detection process (such as the process found in "Recent Advances in Face Detection", M-H. Yang, a tutorial on "Advances in Face Processing: Detection" at the International Conference on Pattern Recognition, 2004, which is hereby incorporated by reference herein in its entirety), utilizing a skin detection process (such as the process found in "A Comparative Assessment of Pixel-Based Skin Detection Methods", V. Vezhnevets, A. Andreeva, Technical Report, Graphics and Media Laboratory, 2005, which is hereby incorporated by reference herein in its entirety), or the approach proposed in Patent Cooperation Treaty Patent Application No. PCT/US2008/013674 entitled "Systems and Methods for Rule-Based Segmentation for Vertical Person or People with Full or Partial Frontal View in Color Images," filed Dec. 12, 2008, which is hereby incorporated by reference herein in its entirety.

Figure 5:
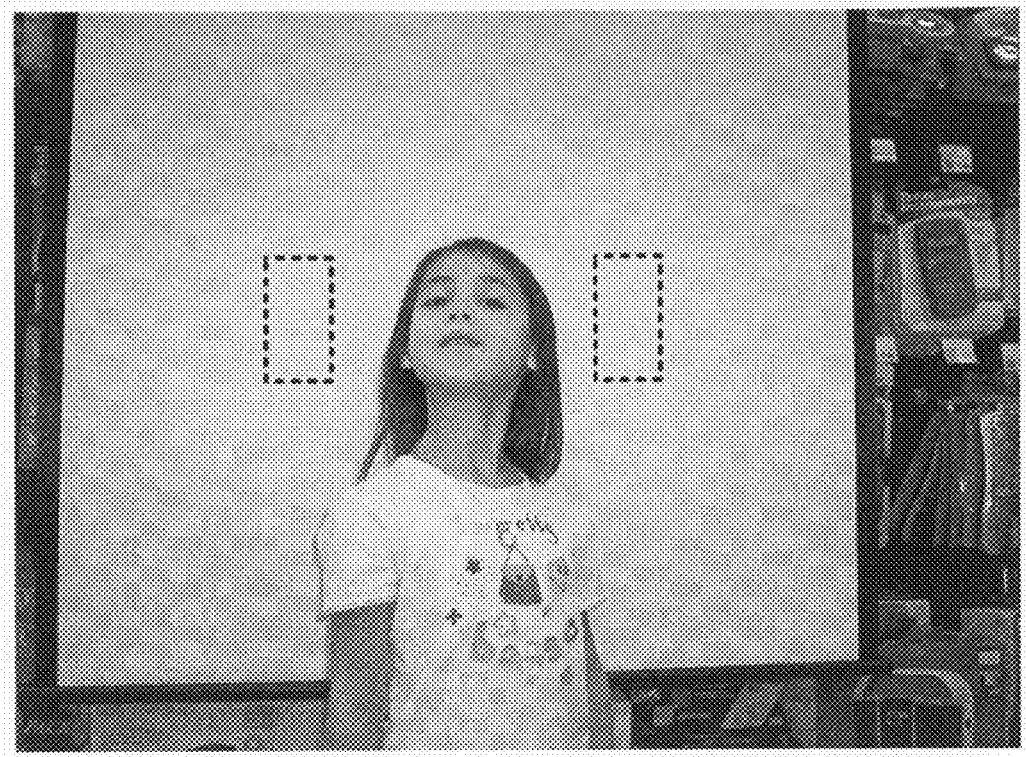
FIG. 5 is the sample color image presented in gray scale of FIG. 3 with two dotted rectangles designating areas initially assumed to be part of the scope of the background.

At 202, FIG. 2, the scope of the background is located. In one embodiment, the scope of the background is already known or manually selected. In an alternative embodiment, the location of the reference area at 201 is utilized in locating the scope of the background. Continuing with the reference area located to be the young girl's face in FIG. 4, areas on either side of the face are likely to be part of the white screen, which, in this example, are part of the scope of the background. For example, since the area immediately adjacent to the face often contains hair or skin (thus, not just background), the areas that may initially be assumed to be part of the white screen could be two rectangular areas, each half a face width away from the face on either side. These areas may have the same height as the face and may be half the width. FIG. 5 is the sample color image presented in gray scale of FIG. 3 with two dotted rectangles designating areas initially assumed to be part of the scope of the background.

Optionally, if a rectangular region contains the edge of the white screen, that region is not used, resulting in one rectangular white screen pixel region rather than two. This occurs when the subject is standing close to one side of the screen. In another embodiment, this is identified by calculating the range of the grayscale pixel values within each region. For example, if the grayscale pixel value range is greater than a certain percentage (for example, seventy-five percent) of the range of the image, it likely contains a screen edge.

Figure 6:
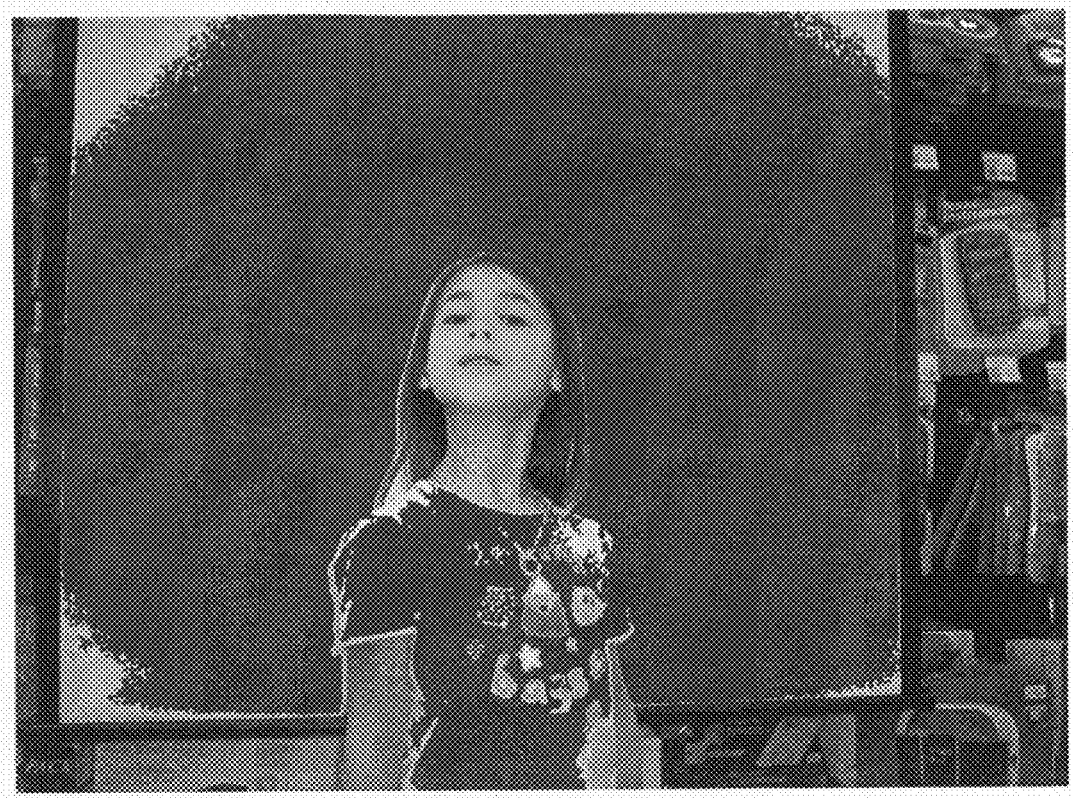
FIG. 6 is the sample color image presented in gray scale of FIG. 3 with pixels that are within values of the sample background pixels in blue presented in gray scale.

Once screen regions are identified (as designated by the rectangles in FIG. 5), the pixels in these regions (also referred to as "sample pixels" or "sample screen pixels") are used to identify the rest of the screen. This labeling may be performed as a pixel level operation, where each pixel in the image is compared to the average values of the sample screen pixels within the rectangle regions. In one embodiment, the red, green and blue (RGB) values for every pixel are compared to the mean red, green and blue values of the sample screen region, where the difference value is used as a proxy for similarity. A threshold may be set for the similarity of the pixel values. For example, the threshold may be set at 0.25. The relative values of the color bands may also be considered by observing the difference between each band. The difference of each band may be compared with the average of the band differences for the sample pixels. For example, the red value of a pixel minus the green value is compared to the average of the red pixel values minus the average of the green pixel values of the sample pixels. A threshold may be set for the relative similarity between the pixels as well. For example, the threshold for relative similarity may be set to 0.15. In another embodiment, both criteria must be met for a pixel to be considered similar to the sample pixels. Further, the image may also be projected into different color spaces and different thresholds may be set, this ability being included within the scope of the disclosed embodiments. FIG. 6 is the sample color image presented in gray scale of FIG. 3 with pixels that are within values of the sample background pixels in blue presented in gray scale.

Figure 7:
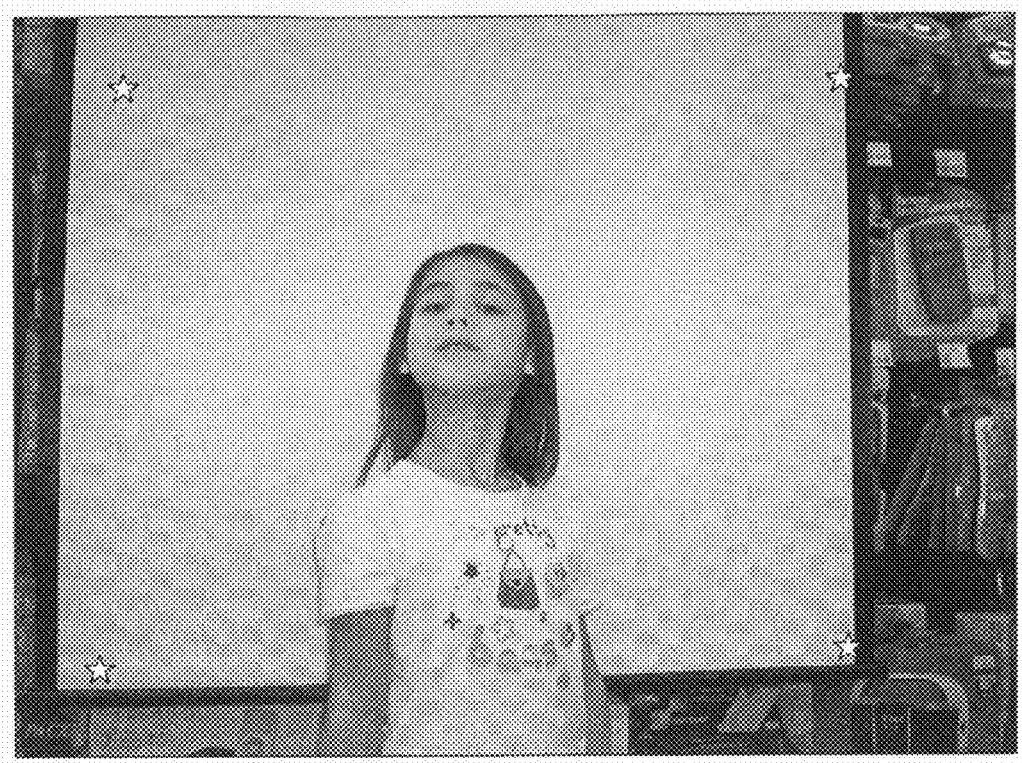
FIG. 7 is the sample color image presented in gray scale of FIG. 3 with stars objects for designating the points within the screen mask that are closest to the edges of the image.

In some cases, the corners of the screen are shadowed, rendering the pixels representing those corners significantly different from the sample screen pixels. Also, not all pixels identified as being similar to the sample screen pixels are necessarily part of the background white screen. Other similarly colored objects are incorrectly labeled as screen pixels. For example, in the sample color image, the subject (the young girl) is wearing a white shirt, resulting in a large portion of her shirt (which is part of the subject of the image) mistaken as part of the white screen. One process for distinguishing between the subject and the white screen background is to utilize information that may be known. For example, it may be known that the screen forms a large, coherent set of pixels. In one embodiment, searching for pixel regions similar to the sample screen pixels, and connected to the same area as the screen regions may be utilized to distinguish pixels likely part of the screen. In an additional embodiment, the distinguished pixels are utilized to produce a mask of the screen. Further, the calculated locations of the corners of the screen may be determined to be the points on the screen mask closest to the corners of the image. FIG. 7 is the sample color image presented in gray scale of FIG. 3 with stars objects for designating the points within the screen mask that are closest to the edges of the image.

Figure 8:
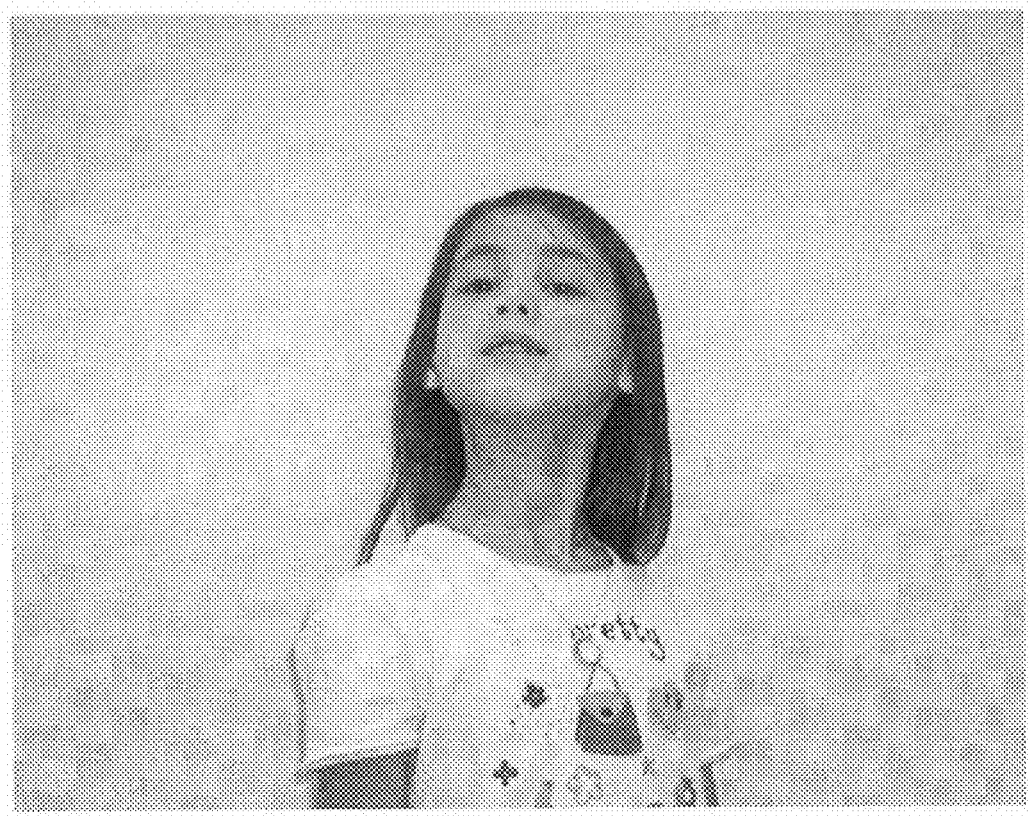
FIG. 8 is the sample color image presented in gray scale of FIG. 3 centered and cropped according to one embodiment of the present invention.

At 203, FIG. 2, the image is cropped based on a subject reference point and the scope of the background. With the location of the scope of the background, the image is ready to be cropped to include only the scope of the background. As explained above, in the embodiment that utilized the subject reference point to determine the location of the scope of the background, the location of the scope of the background can now be utilized to crop the image. For example, the cropping may be processed by removing areas outside the white screen, the bounds of which are identified by its corners. In another embodiment, the image may be cropped further such that the subject is centered with some margin. FIG. 8 is the sample color image presented in gray scale of FIG. 3 centered and cropped according to one embodiment of the present invention.

Figure 9:
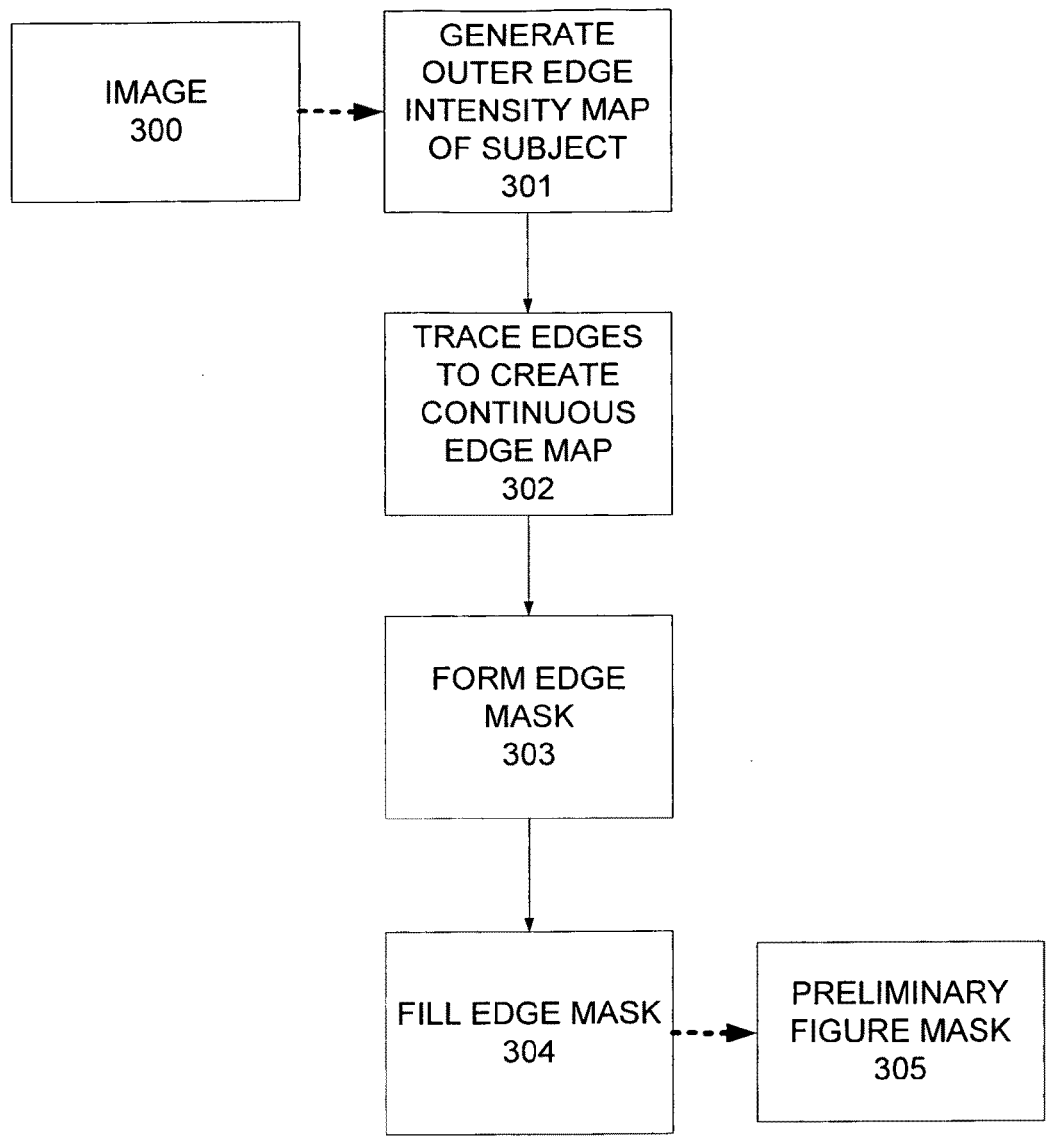
FIG. 9 is a diagrammatic illustration of a system, process or method for creating a preliminary figure mask of an image utilizing an edge-based process according to one embodiment.

In the embodiment illustrated in FIG. 1, at 101, a preliminary figure mask is created from an image utilizing an edge-based process. FIG. 9 is a diagrammatic illustration of a system, process or method for creating a preliminary figure mask of an image utilizing an edge-based process according to one embodiment. A preliminary figure mask might be an approximate mask of the subject with rough edges. At 301, an outer edge intensity map is generated of the subject in the image 300.

To create an edge map, an edge detection process may be utilized. Physical edges may be boundaries between adjacent objects or regions within an object, such as the boundaries between stripes in a patterned cloth. In image processing, edge detection for latter case is easier than in the former case when the two adjacent objects are similar in color and intensity. Current edge detection methods have difficulty finding the boundary between two adjacent, similarly colored objects. There are two primary methods for finding edges in an image, the first being looking for maxima and minima in the first derivative of the image (gradient-based method) and the second is looking for zero crossings in the second derivative of the image (Laplacian-based method). Both methods produce a map of edge locations and relative intensities, but have different properties and tradeoffs. More information regarding edge detection and methods for edge detection can be found in Phillip A. Mlsna, and Jeffrey J. Rodriguez. "4.13 Gradient and Laplacian Edge Detection" Handbook of Image and Video Processing, Second Edition. Elsevier Inc. 2005. pg 535-553, which is hereby incorporated by reference in its entirety. In some an embodiments disclosed here, an original combination of edge detection methods is described with novel additions to handle adjacent objects of similar colors, such as a person in front of a similarly colored screen.

In one embodiment, the outer edge intensity map is generated by first creating a general edge intensity map. To do so, any number or combination of edge detection processes might be utilized. For example, Sobel filters might be utilized on the luminosity of the image. Luminosity may be approximated as the mean of the three color channels (RGB). The row and column Sobel filters are applied to form vertical and horizontal intensity edge maps. The filter values are as follow:

$$filter_{row} = \begin{matrix} -1 & -2 & -1 \\ 0 & 0 & 0 \\ 1 & 2 & 1 \end{matrix} \quad filter_{column} = \begin{matrix} -1 & 0 & 1 \\ -2 & 0 & 2 \\ -1 & 0 & 1 \end{matrix}$$

Figure 10:
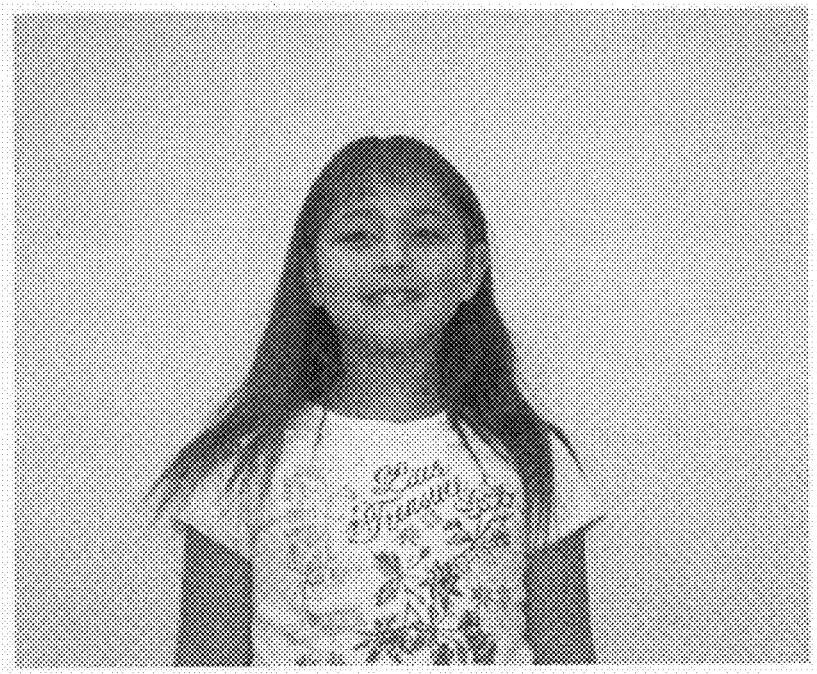
FIG. 10 contains a sample image presented in gray scale at 500 with a corresponding general edge intensity map at 501.
Figure 10:
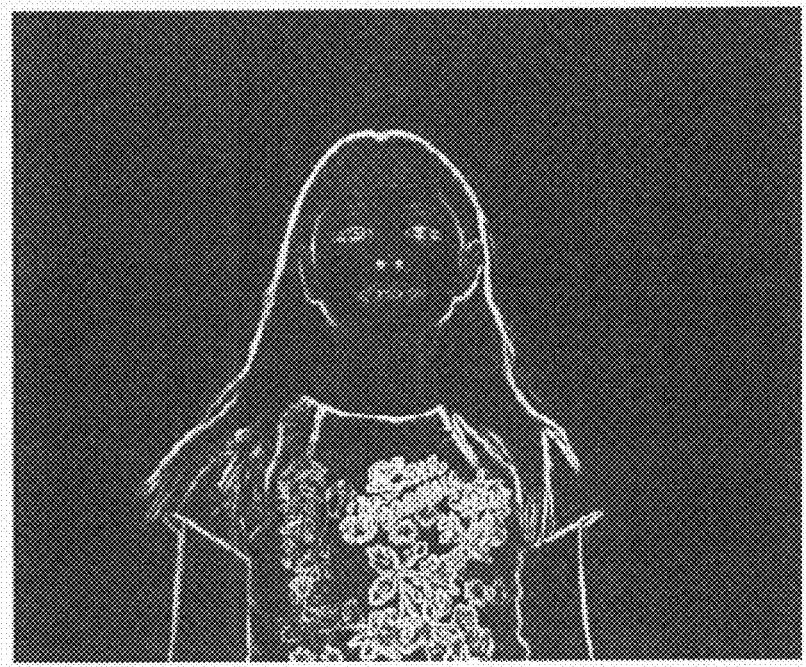

As apparent from the filters, Sobel filters are a type of gradient-based edge detector. Their form is preferable to a simple difference filter because they have a slight smoothing effect. They also have an advantage over an averaging filter in that they have a smoother frequency response. (Mlsna and Rodriguez, p. 542) Two operators are necessary in gradient-based edge detection methods because gradients are vector quantities. The two resulting edge maps are horizontal and vertical edge maps where one map provides the row vector and the other provides the column vector. The magnitude of these vectors may be calculated to form an initial edge intensity map. FIG. 10 contains a sample image presented in gray scale at 500 with a corresponding general edge intensity map at 501.

The general edge intensity map may have gaps or lower intensities between objects of similar color. These edges may be enhanced using coherence enhancing diffusion. Coherence enhancing diffusion is a process of enhancing structures within images using nonlinear diffusion filters. A detailed explanation for coherence enhancing diffusion can be found in "Coherence-Enhancing Diffusion Filtering", J. Weickert, International Journal of Computer Vision, Vol. 31, No. 2/3, pp. 111-127, April 1999, which is hereby incorporated by reference. The enhanced general edge intensity map may be utilized to strengthen the edges in the original image 300. To do so, the enhanced general edge intensity map might be multiplied by 0.2, or other constant, and added to every channel (RGB) of the original image 300. The result of edge detection and enhancement thus far is to produce an image with stronger edges.

An edge detection process may be performed on every channel of the adjusted RGB channels of the original image to produce a binary edge map. One example of such an edge detection process is the Canny edge detector. The Canny edge detector is a multistep process that involves filtering an image, calculating edge intensities and orientations and using two thresholds in a process called hysteresis to produce a final map. It produces results with low detection errors, localized edges and single responses to edges. A detailed explanation of the Canny edge detector is provided in Canny, J., *A Computational Approach To Edge Detection*, IEEE Trans. Pattern Analysis and Machine Intelligence, 8:679-714, 1986, which is hereby incorporated by reference in its entirety. Ideally, parameters utilized for the edge detection process should be set to minimize false positives in the background of the image and maximize the edge detections on the figure (or subject). For example, when utilizing the Canny edge detector, the parameters may be set as follows:

Theshold$_{Low}$=0.04
Threshold$_{High}$=0.1
Sigma=0.5

Figure 11:
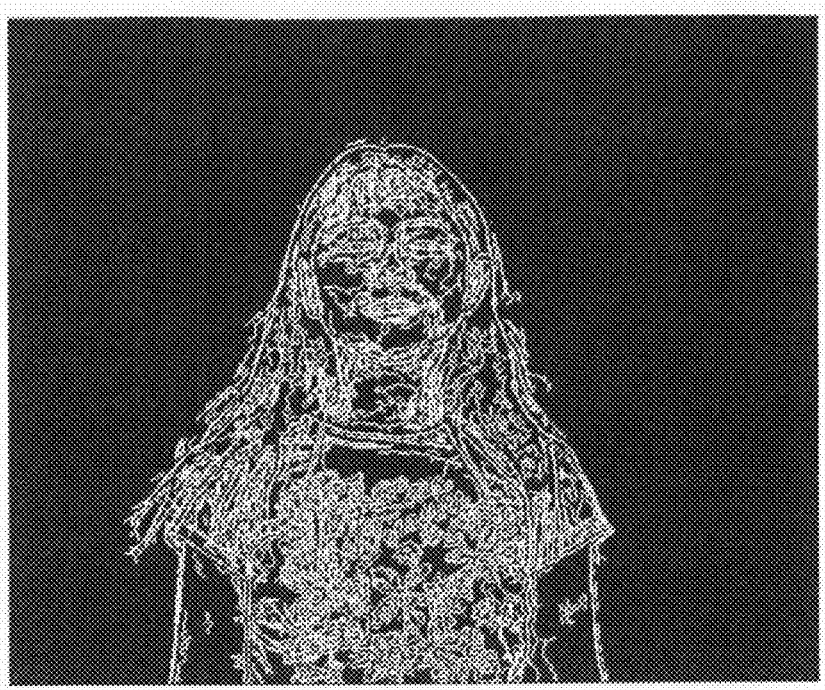
FIG. 11 contains a binary edge map at 502 for the sample image 500 of FIG. 10 and contains a simplified binary edge map at 503 from the binary edge map.
Figure 11:
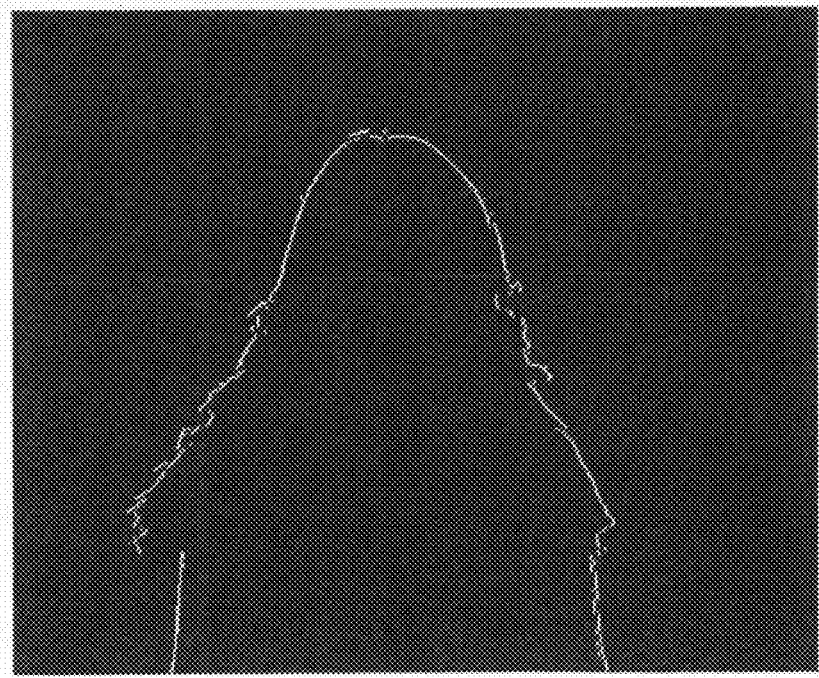

The edges detected in all three channels may be combined using a logical OR operation to form one binary edge map. A simplified binary edge map is created by removing the interior edge pixels from the binary edge map. One process for creating the simplified binary edge map is to preserve only the pixels closest to the top and sides of the original image. FIG. 11 contains a binary edge map at 502 for the sample image 500 of FIG. 10 and contains a simplified binary edge map at 503 from the binary edge map.

Figure 12:
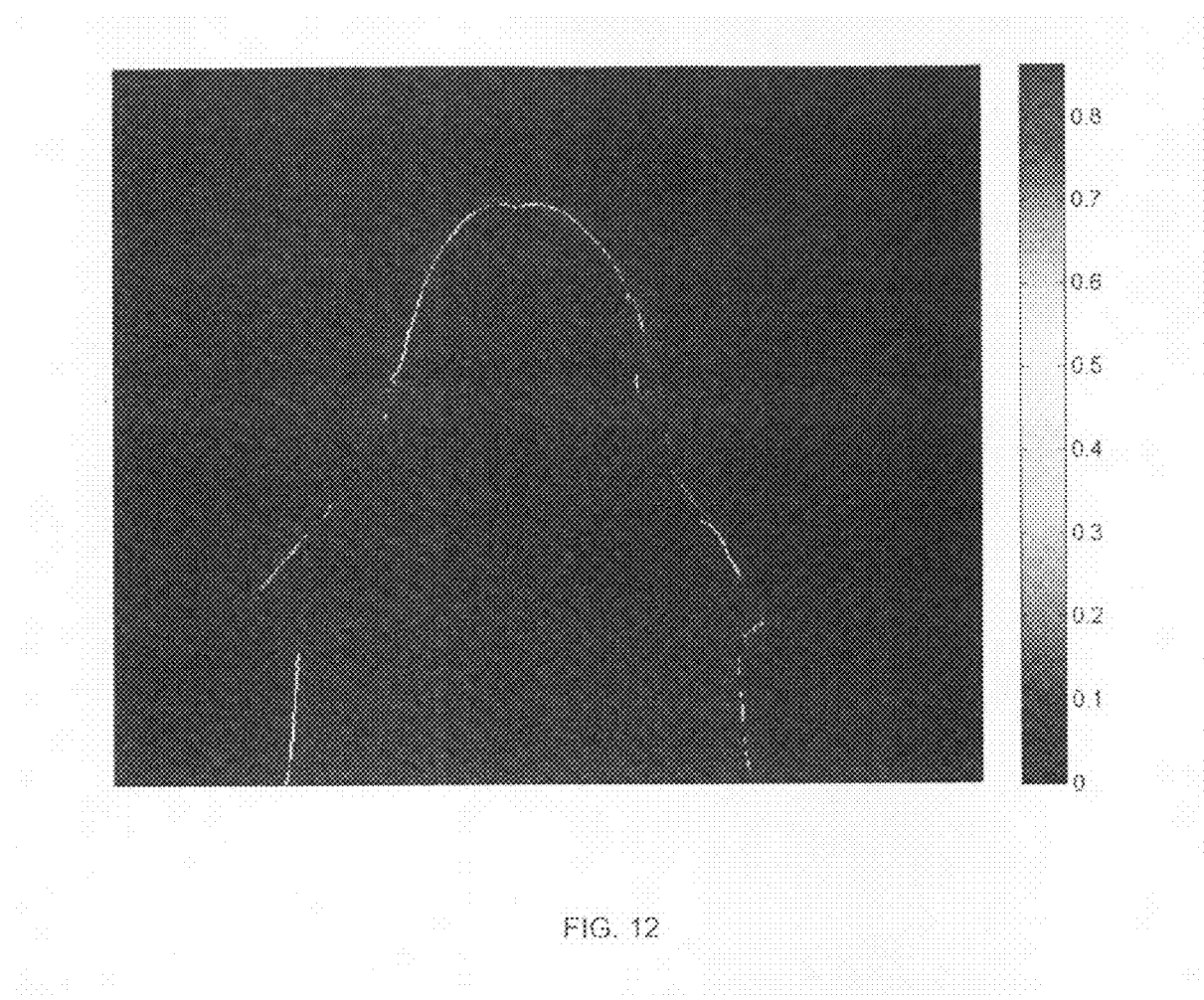
FIG. 12 is the outer edge intensity map presented in gray scale generated by the multiplication of the binary edge map at 503 of FIG. 11 and the general intensity edge map at 501 or FIG. 10.

In this embodiment, to generate the outer edge intensity map, the simplified binary edge map at 503 and the general intensity edge map at 501 are multiplied together. FIG. 12 is the outer edge intensity map presented in gray scale generated by the multiplication of the binary edge map at 503 of FIG. 11 and the general intensity edge map at 501 of FIG. 10.

Figure 13:
FIG. 13 is the orientation edge map presented in gray scale generated by calculating the angle between the row and column edge intensities on a per pixel basis of image 500 in FIG. 10.
Figure 13:
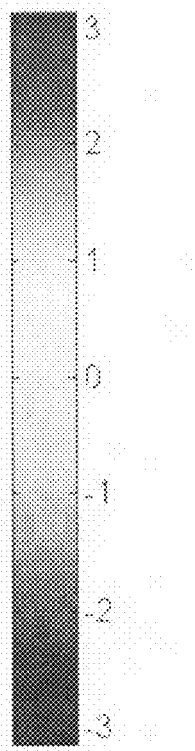

Other edge maps may be utilized or created from edge detector processes. For example, an orientation edge map may be created. An orientation edge map could be utilized to show the direction of the edges found. In one embodiment, an orientation edge map is created by calculating the angle between the row and column edge intensities created by Sobel operators, as referenced above, on a per pixel basis. This calculation is performed by taking the inverse tangent relative to 2 times pi, of the vertical edge intensity divided by the horizontal edge intensity. FIG. 13 is the orientation edge map presented in gray scale generated by calculating the angle between the row and column edge intensities on a per pixel basis of image 500 in FIG. 10.

In the diagrammatic illustration of the embodiment in FIG. 9, edges in the outer edge intensity map are traced to create a continuous edge map at 302. In one embodiment, the edges of the outer edge intensity map are traced to form paths from the bottom to the top of the subject. The paths are traced by connecting pixels in the outer edge intensity map, favoring connections that are consistent with the orientations of the edges. Optionally, path tracing is performed on the right and left sides of the outer edge intensity map separately.

Figure 14:
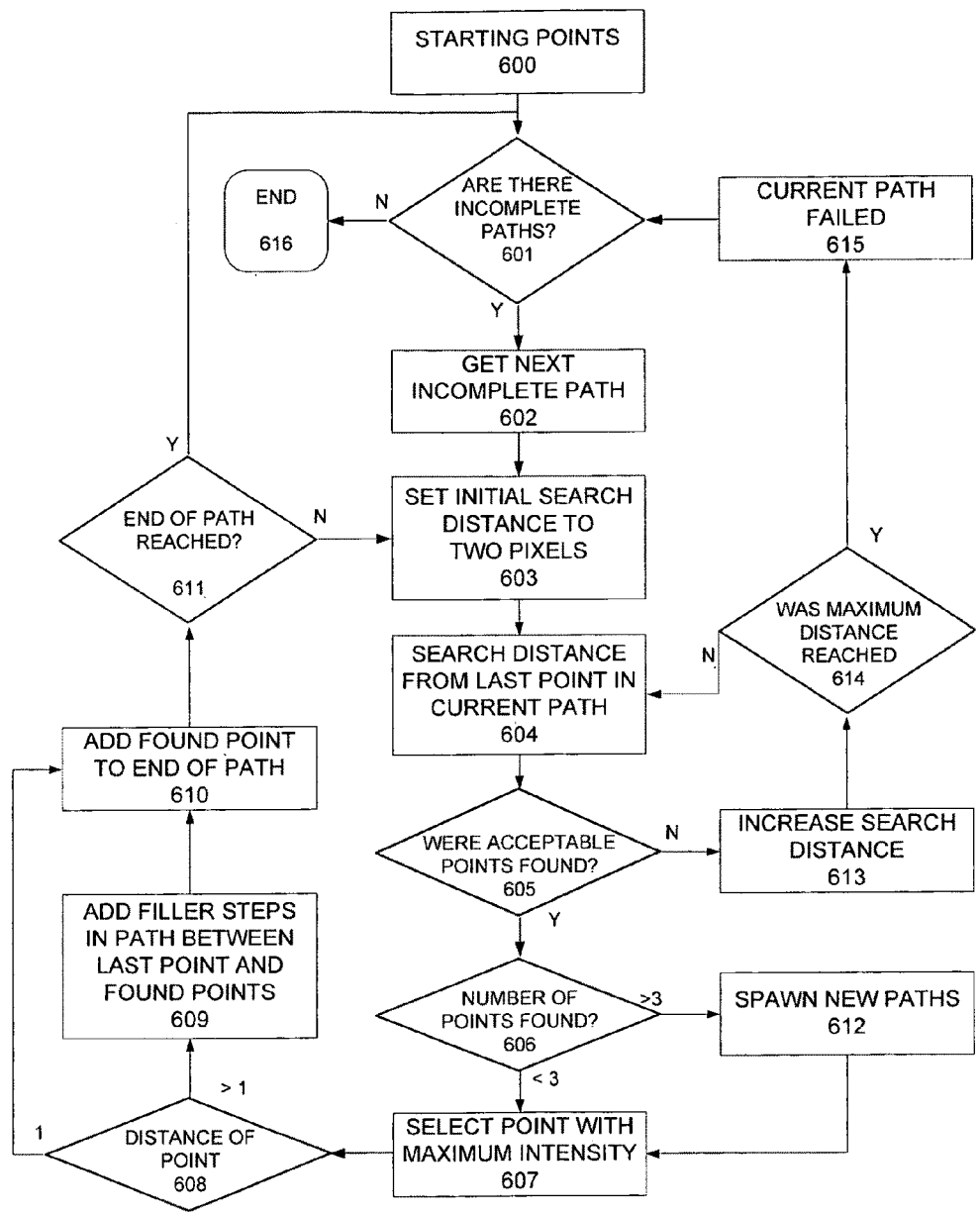
FIG. 14 is a diagrammatic illustration of a path tracing process flowchart according to one embodiment of the present invention.
Figure 15:
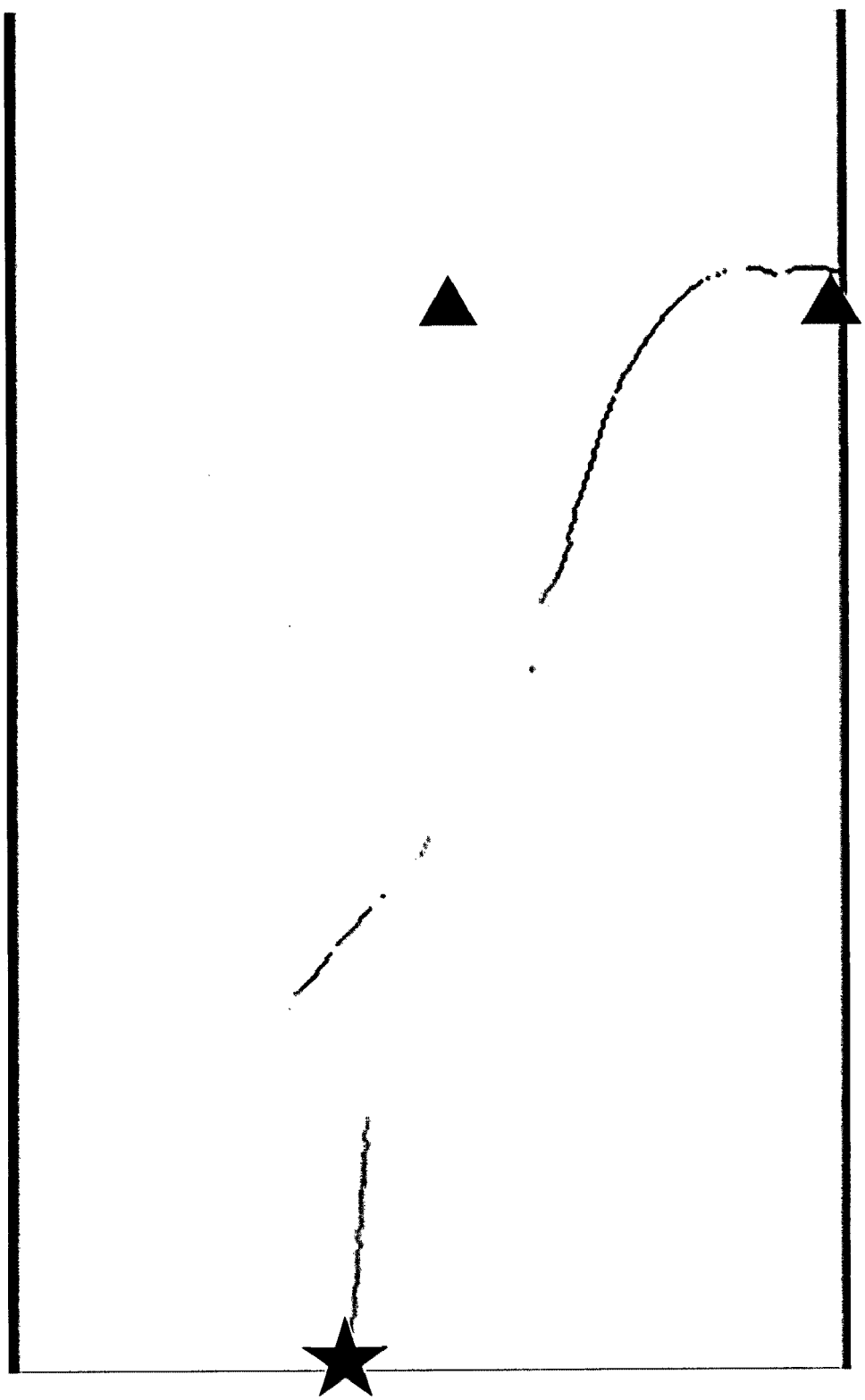
FIG. 15 is an illustration representing the left half of the outer edge intensity map presented in gray scale of FIG. 12 with a star object for designating the starting point and triangle objects designating the left and right bounds of the range of ending points for the left half.

FIG. 14 is a diagrammatic illustration of a path tracing process flowchart according to one embodiment of the present invention. At 600, starting points are determined by searching for pixels at the bottom row of the outer edge intensity map with intensities greater than a set threshold. For example, this threshold may be set at 0.025. If no edges are found on the bottom row, the search moves up until a starting point is found. The acceptable ending points for a path may be defined as points on the row an eighth of a face height above the top of the face, between half a face width outside the face and the middle of the centered and cropped image. FIG. 15 is an illustration representing the left half of the outer edge intensity map presented in gray scale of FIG. 12 with a star object for designating the starting point and triangle objects designating the left and right bounds of the range of ending points for the left half.

After finding a starting point at 600, an initial search distance of 1 or 2 pixels is set at 603. More pixels may be set as an initial search distance; this will have a smoothing effect on the continuous edge map. Then, a search of that distance is conducted from the last point in the current path at 604. The point with the maximum intensity is selected at 607 and added to a path. If no acceptable points are found within that distance at 605, the process increases the search radius distance at 613 until a search of that distance at 604 finds acceptable points at 605 or the maximum search distance is reached for that point at 614. If no point is found, the path is labeled failed at 615. If a point is found more than one pixel away at 608, the gap is interpolated and filled in at 609. This effectuates every row having at least one point in the path. The found point is added to the end of the path at 610. If the end of the path is not reached, the process repeats with the search for initial search distance of 1 or 2 pixels at 603 and continues as explained above. If the end of the path is reached, then the process determines whether any additional paths that haven't failed or reached the end points remain at 601 and gets the next path at 602 if one or more exist. Further, as mentioned above, a path might be labeled as failed at 615. Once labeled, the process reverts to the same step as a completed path; it determines whether any continuing paths remain at 601 and gets the next path at 602 if one exists. If such a path does exist, then the process will set an initial search distance of 1 or 2 pixels at 603 and then the process would continue as explained above. If no incomplete paths are found at 601, the process ends at 616.

If the search distance has expanded past three pixels, or some set number of pixels, and multiple points are found at 606, the process spawns new paths at 612. The points with the highest intensities and greater than the set pixel distance away from the starting point are used to form new paths. In this embodiment, no more than three paths are spawned at a time, but this may be adjusted to produce a different number of paths. This functionality allows paths to follow multiple branches and also makes the process more robust by making it less susceptible to stray pixels.

Figure 16:
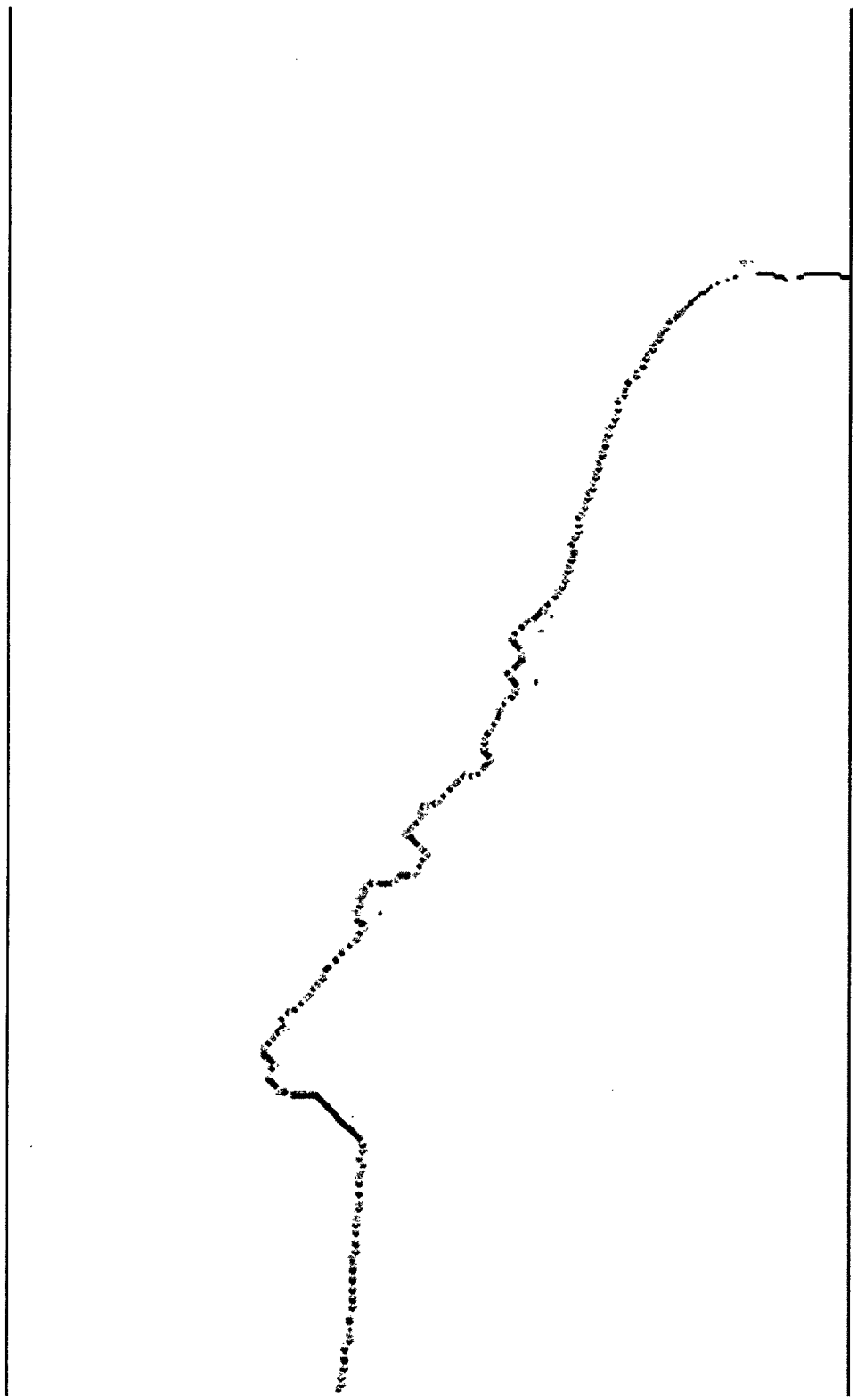
FIG. 16 is an illustration representing the portion of the outer edge intensity map presented in gray scale of FIG. 15 with a traced path according to one embodiment.

In another embodiment, the orientation of the current pixel plays a factor in the search for the next pixel in a path. While the process looks for the next closest pixel with the highest intensity, the pixel intensity is weighted by the orientation of the current pixel. The process would favor pixels within 45 degrees on either side of the current pixel orientation by a factor of four to one. For example, at the side of the head of the subject, pixels tend to run vertical. In searching for a connecting pixel, pixels directly above the current pixel will be multiplied by a weight of one; pixels to the left and right will be multiplied by a weight of a quarter or some other value less than one. FIG. 16 is an illustration representing the portion of the outer edge intensity map presented in gray scale of FIG. 15 with a traced path according to one embodiment.

In the diagrammatic illustration of the embodiment in FIG. 9, an edge mask is formed at 303. The edge mask may be formed utilizing the paths traced in the step 302 and optionally a screen mask (explained above). The path tracing process may produce multiple paths; however, one must be chosen for the final mask. One process for selecting a path is to determine which path possesses the highest average edge intensity. The average edge intensity is found by adding up the edge intensity values in the edge intensity map for every point along a path and dividing by the number of points. Since filler points may have an intensity of zero, paths with more filler pixels will likely have lower average values. Paths that more closely follow the outline of the figure are more likely to have higher average intensity values. Failed paths that do not reach the end pixel range are not considered.

Figure 17:
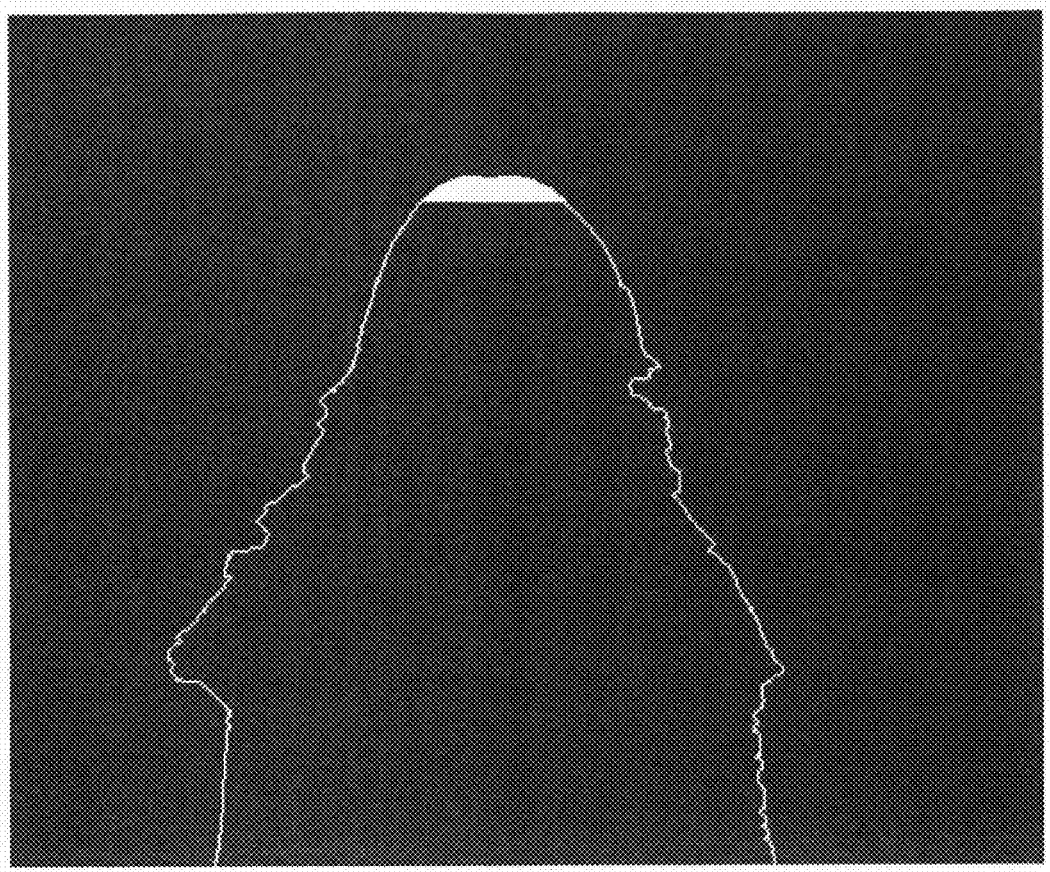
FIG. 17 is an illustration of an edge mask created based on image 500 in FIG. 10. In the diagrammatic illustration of the embodiment in FIG. 9, the edge mask is filled at 304 to effectuate a preliminary figure mask at 305.
Figure 18:
FIG. 18 is the illustration of the edge mask in FIG. 17 with the pixels within the mask filled in from the original or cropped and centered image, creating a preliminary figure mask presented in gray scale.

In some embodiments explained above, the end of the paths do not reach the top of the figure (i.e. does not reach the top of the figure's head). In these embodiments, that part of the mask can be added utilizing the original screen mask. An approximate figure mask may be taken as the opposite of the screen mask. The region of this mask, located above the face, but not connected to the screen is assumed to be the head region. The top of the head region is placed on top of the edge mask to complete the paths. FIG. 17 is an illustration of an edge mask created based on image 500 in FIG. 10. In the diagrammatic illustration of the embodiment in FIG. 9, the edge mask is filled at 304 to effectuate a preliminary figure mask at 305. FIG. 18 is the illustration of the edge mask in FIG. 17 with the pixels within the mask filled in from the original or cropped and centered image, creating a preliminary figure mask presented in gray scale.

In the diagrammatic illustration of the embodiment in FIG. 1, the preliminary mask is refined utilizing a certain technique or techniques at 102. The preliminary figure mask, though presenting a main portion of the figure fairly well, may need refinement to represent the figure more accurately. For example, the preliminary figure mask might incorporate shadow pixels or stray hairs outside the main figure. The refinement may incorporate any number of techniques to help represent the figure more accurately.

Figure 19:
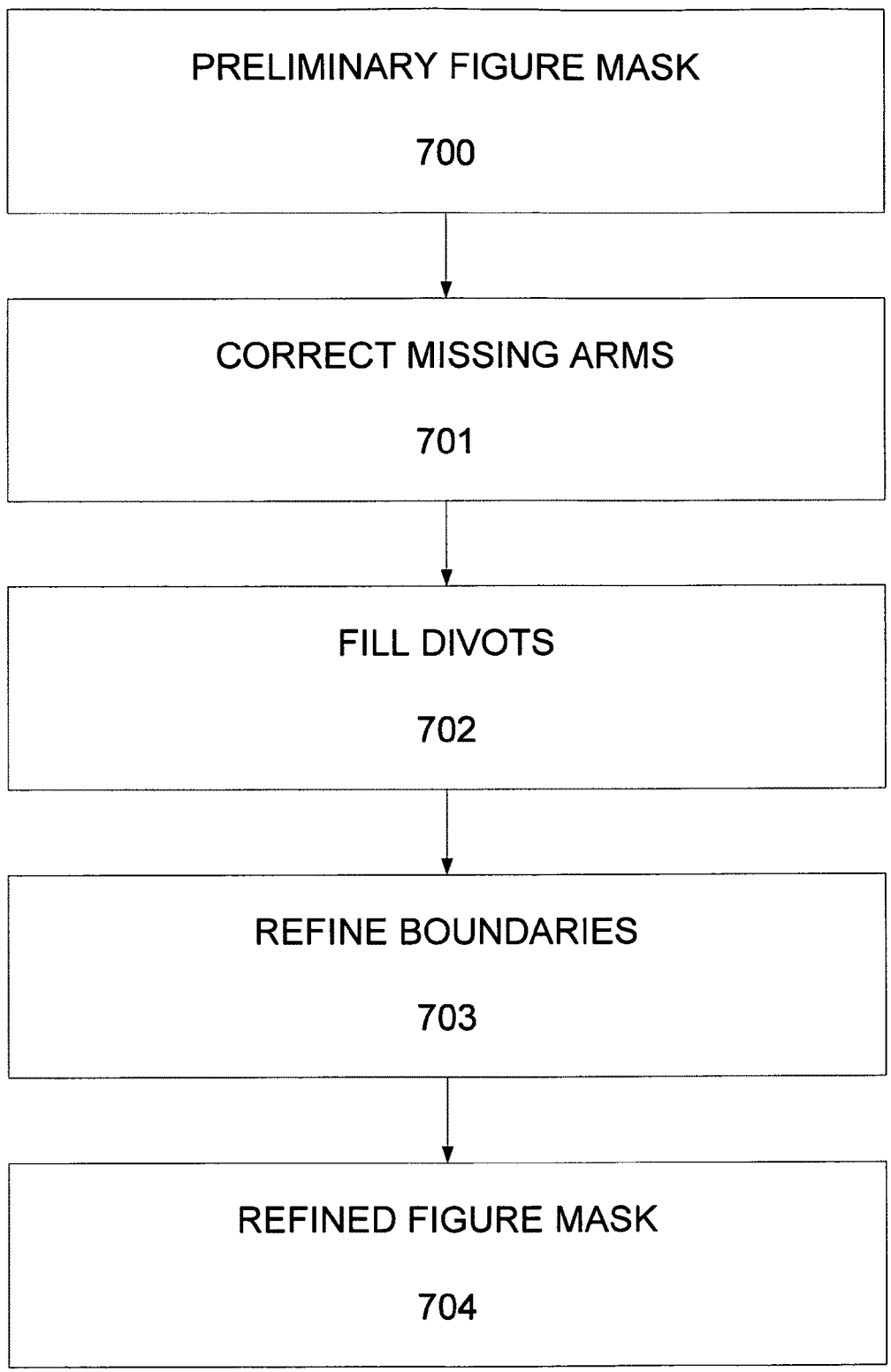
FIG. 19 is a diagrammatic illustration of a refinement sub-process for a preliminary figure mask according to one embodiment.

FIG. 19 is a diagrammatic illustration of a refinement sub-process for a preliminary figure mask according to one embodiment. It will be apparent to one skilled in the art that this embodiment is provided as an example, that the order or number of techniques utilized could be lessened or increased, and that the refinement operation could be done utilizing any number of known techniques, all of which are incorporated herein. In this embodiment, a preliminary figure mask is chosen for refinement at 700. Then the embodiment will correct missing pixel regions, for example missing arms or arm pixel regions (or areas) at 701. When the figure is wearing clothing the same color as the background (or even limited intensity variations of the same color), the edge of the figure's arm may be too faint to be found in the binary edge map. To retrieve the missing edge, one may utilize the original general intensity edge map of the image.

One indication that regions such as an arm or arm pixel regions are incomplete may be when the widest point of the preliminary figure mask is not at the bottom of the mask. If this is the case, the sub-process attempts to find edges external to the preliminary figure mask, and trace arm paths in a manner similar to path tracing for the initial figure mask. This may be done by removing areas of the general intensity edge map that are located in the preliminary figure mask. Then the sub-process may search for local maxima of the remaining pixels in the bottom row of the general intensity edge map. At any points where the edge strength minus the average energy of the row is greater than twice the standard deviation of the energy of the row, may be utilized as starting points for path tracing. Other metrics may be used to find pixels of sufficient energy that make them likely to be a shirt edge. Acceptable end points for arm paths may be the points on the same row as the widest point of the figure mask and in columns internal to the edge of the preliminary figure mask.

Figure 20:
FIG. 20 contains a sample preliminary figure mask at 800 and an intermediate figure mask at 801 according to one embodiment each presented in gray scale.
Figure 20:
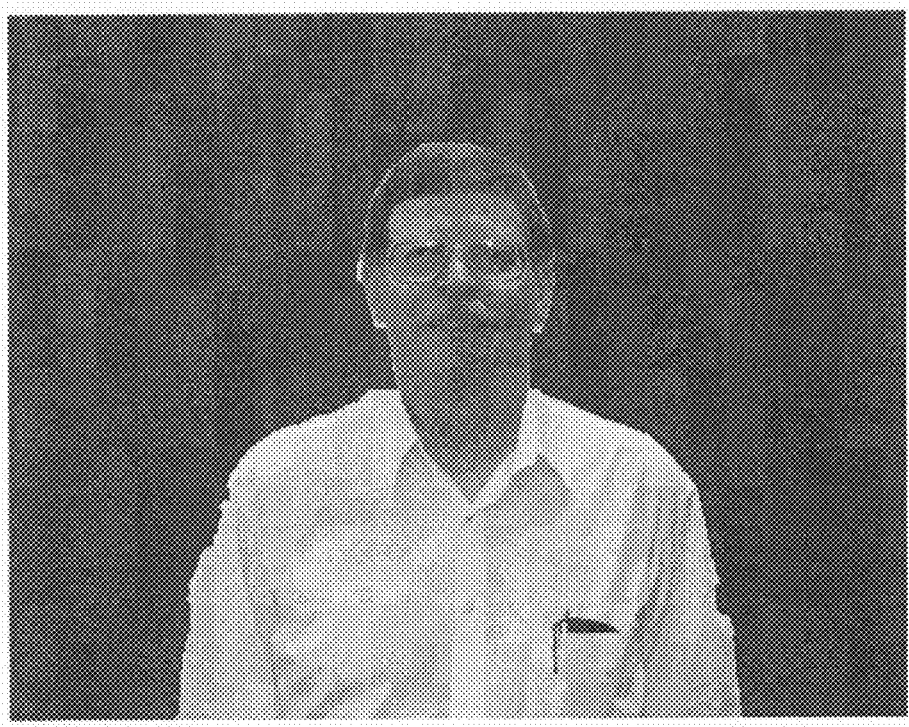

In this embodiment, the left and right sides of the preliminary figure mask are processed separately. The starting and ending points are independently determined using the general intensity edge map and the preliminary figure mask. Paths are then traced for each side where the widest point is not at the bottom of the preliminary figure mask. Of the paths that reach their correct end ranges, the best paths are chosen using the same average energy criteria as utilized to formulate the edge mask (explained above). If a new figure mask section edge is found, the area between the new edge and the rest of the preliminary figure mask is filled to produce an intermediate figure mask. FIG. 20 contains a sample preliminary figure mask at 800 and a intermediate figure mask at 801 according to one embodiment each presented in gray scale.

In the embodiment diagrammatically illustrated in FIG. 19, the refinement sub-process would then fill divots found in the intermediate figure mask at 702. Divots can occur on the sides of the figure mask is cases of weak edges between the background and the figure. To remove divots, a form of smoothing may be applied between the shoulders and the elbows of the figure. One example for conducting a form of smoothing requires finding the longest distance between the widest point of the face to any point along the edge of the intermediate figure mask such that the line crosses the figure mask a minimum number of times. This point determines the location of the shoulder. The elbow is assumed to be the widest point of the intermediate figure mask; however this may not correspond to a physical elbow. The assumption is based on finding the best section of the figure mask to form a normally straight line. To fill in divots between the shoulder and the elbow, a best fit line for that section of the intermediate figure mask is first calculated using a least squares method. The best fit line is then removed from the figure mask line between the shoulder and elbow. The sub-process then looks for local minima along that line, and connects the local maxima on either side of the minima. The search for local minima and subsequent connect of local maxima is repeated multiple times for cases for internal minima.

As illustrated in FIG. 19, the embodiment would then refine boundaries at 703 such that a refined figure mask is effectuated at 704. The final refinement involves the well-known matting process called Random Walker, explained in "Random Walks For Image Segmentation", Grady L., IEEE Transactions on Pattern Analysis and Machine Intelligence (PAMI), pp. 1768-1783, vol. 28, November 2006, which is hereby incorporated by reference in its entirety herein. When the contrast of boundary is low, the Random Walker matting process does not preserve the boundary of the figure. A simple moving average boundary smoothing technique can be utilized in low contrast regions and Random Walker may be utilized elsewhere.

To determine whether there is a low contrast edge, the maximum range of color among the 3 color channels (red, green, blue) is determined for selected regions or neighborhoods of the figure mask. The maximum standard deviation among 3 color channels is also determined for each selected region or neighborhood. If either the maximum range or the maximum standard deviation is below a certain threshold, then that neighborhood is considered to be of low contrast. For example, the threshold values may be 0.4 and 0.1 respectively for maximum range and maximum standard deviation.

The matting process is applied to the inputted figure mask to estimate the matting coefficient for pixels in high contrast margin. A threshold is applied to the resulting mask to get a binary mask. This mask formatting process is intersected with the inputted figure mask. The boundary of the resulting intersection is smoothed along the perimeter using a moving average filter. This is achieved by extracting x, y indices of the contour and smoothing them independently using a moving average filter. The length of the filter is chosen to be the logarithm (base 2) of the length of contour. Any possible small holes and islands in the resulting mask are removed.

The entire boundary refinement process may be repeated after the mask is scaled up to the original pixel resolution. The only difference is that a threshold is not applied to the result of matting. Thus, the final mask may be fuzzy.

Figure 21:
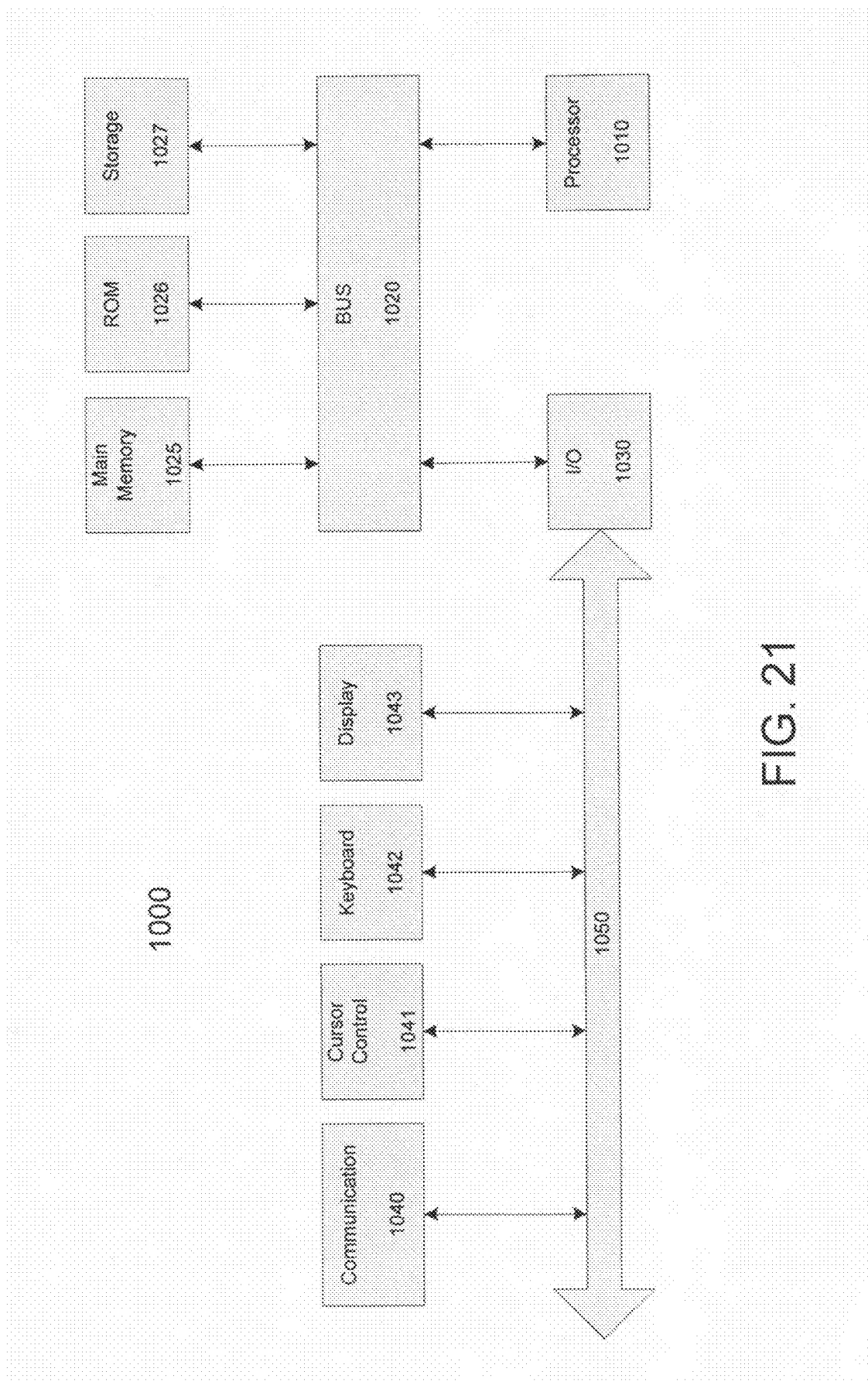
FIG. 21 is a block diagram of an exemplary computer architecture for use with the present system, according to one embodiment of the present invention.

As desired, the image processing method for segmentation may be executable on a conventional general-purpose computer (or microprocessor) system. Additionally, or alternatively, the method for person segmentation may be stored on a conventional storage medium for subsequent execution via the general-purpose computer. FIG. 21 is an illustration of an exemplary embodiment of an architecture 1000 of a computer system suitable for executing the method for segmentation Computer architecture 1000 is used to implement the computer systems or image processing systems described in various embodiments of the method for segmentation. As shown in FIG. 21, the architecture 1000 comprises a system bus 1020 for communicating information, and a processor 1010 coupled to bus 1020 for processing information. Architecture 1000 further comprises a random access memory (RAM) or other dynamic storage device 1025 (referred to herein as main memory), coupled to bus 1020 for storing information and instructions to be executed by processor 1010. Main memory 1025 is used to store temporary variables or other intermediate information during execution of instructions by processor 1010. Architecture 1000 includes a read only memory (ROM) and/or other static storage device 1026 coupled to bus 1020 for storing static information and instructions used by processor 1010. Although the architecture 1000 is shown and described as having selected system elements for purposes of illustration only, it will be appreciated that the method for segmentation can be executed by any conventional type of computer architecture without limitation.

A data storage device 1027 such as a magnetic disk or optical disk and its corresponding drive is coupled to computer system 1000 for storing information and instructions. The data storage device 1027, for example, can comprise the storage medium for storing the method for segmentation for subsequent execution by the processor 1010. Although the data storage device 1027 is described as being magnetic disk or optical disk for purposes of illustration only, the method for segmentation can be stored on any conventional type of storage media without limitation.

Architecture 1000 is coupled to a second I/O bus 1050 via an I/O interface 1030. A plurality of I/O devices may be coupled to I/O bus 1050, including a display device 1043, an input device (e.g., an alphanumeric input device 1042 and/or a cursor control device 1041).

The communication device 1040 is for accessing other computers (servers or clients) via a network. The communication device 1040 may comprise a modem, a network interface card, a wireless network interface, or other well known interface device, such as those used for coupling to Ethernet, token ring, or other types of networks.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this detailed description, but rather by the claims following.

What is claimed is:

1. A method of identifying a foreground object of an image from a background object of said image, said method comprising:

generating an outer edge intensity map associated with said foreground object, wherein information associated with said image is stored in a memory component;

generating a plurality of paths on a continuous edge map from said outer edge intensity map, wherein said plurality of paths on said continuous edge map is created by connecting pixels in said outer edge intensity map; and forming an edge mask by selecting one path on said continuous edge map from said plurality of paths on said continuous edge map, wherein said selecting is based on a highest average edge intensity.

2. The method as described by claim 1, wherein Sobel filters are used to generate said outer edge intensity map.

3. The method as described by claim 1, wherein said outer edge intensity map comprises a horizontal and a vertical edge map, wherein magnitude of said horizontal and said vertical edge maps provide initial edge intensity map.

4. The method as described by claim 1, wherein said outer edge intensity map is generated for each color channel of red, green and blue (RGB) channels.

5. The method as described by claim 4, wherein outer edge intensity map for each color channel is combined to create a binary edge map.

6. The method as described by claim 1, wherein orientation edge map is used to generate said outer edge intensity map.

7. The method as described by claim 1, wherein said generating said plurality of paths on said continuous edge map comprises:
   searching for a first pixel at a row of said outer edge intensity map that has an intensity greater than a threshold;
   identifying a next pixel from a plurality of pixels, wherein said plurality of pixels is within a certain distance from said first pixel, and wherein said next pixel has an intensity value greater than other pixels within said plurality of pixels;
   increasing said certain distance to create a new distance if said next pixel is unidentifiable and repeating said identifying using said new distance;
   selecting said next pixel as a pixel in said continuous edge map; and
   repeating said searching, said identifying, said increasing, and said selecting to form said plurality of paths on said continuous edge map.

8. The method as described by claim 7, wherein said intensity value is pixel intensity weighted by an orientation of pixel associated therewith.

9. The method as described by claim 1 further comprising:
   prior to said generating said outer edge intensity map, locating a reference point associated with said foreground object;
   determining a scope of said background object; and
   cropping and centering said image based on said reference point and further based on said scope of said background object.

10. The method as described by claim 9, wherein said locating said reference point is in response to a user selection, and wherein said scope of said background object is determined based on said reference point or based on a user selection.

11. The method as described by claim 1, wherein a color associated with said foreground object is similar to a color of said background object.

12. A non-transitory computer readable storage medium having computer-readable program code stored thereon for causing a processor to implement a method comprising:
   generating an outer edge intensity map associated with a foreground object of an image;
   generating a plurality of paths on a continuous edge map from said outer edge intensity map, wherein said plurality of paths on said continuous edge map is created by connecting pixels in said outer edge intensity map; and
   forming an edge mask by selecting one path on said continuous edge map from said plurality of paths on said continuous edge map, wherein said selecting is based on a highest average edge intensity.

13. The non-transitory computer readable storage medium as described by claim 12, wherein said generating said plurality of paths on said continuous edge map comprises:
   searching for a first pixel at a row of said outer edge intensity map that has an intensity greater than a threshold;
   identifying a next pixel from a plurality of pixels, wherein said plurality of pixels is within a certain distance from said first pixel, and wherein said next pixel has an intensity value greater than other pixels within said plurality of pixels;
   increasing said certain distance to create a new distance if said next pixel is unidentifiable and repeating said identifying using said new distance;
   selecting said next pixel as a pixel in said continuous edge map; and
   repeating said searching, said identifying, said increasing, and said selecting to form said plurality of paths on said continuous edge map.

14. The non-transitory computer readable storage medium as described by claim 13, wherein said intensity value is pixel intensity weighted by an orientation of pixel associated therewith.

15. The non-transitory computer readable storage medium as described by claim 12, wherein said method further comprises:
   prior to said generating said outer edge intensity map, locating a reference point associated with said foreground object;
   determining a scope of said background object; and
   cropping and centering said image based on said reference point and further based on said scope of said background object.

16. The non-transitory computer readable storage medium as described by claim 12, wherein Sobel filters are used to generate said outer edge intensity map.

17. The non-transitory computer readable storage medium as described by claim 12, wherein orientation edge map is used to generate said outer edge intensity map.

18. A computer system comprising:
   a processor;
   a display; and
   a memory coupled to said processor and said display, wherein said memory comprises computer-readable program code stored thereon for causing said processor to implement a method comprising:
   generating an outer edge intensity map associated with a foreground object of an image;
   generating a plurality of paths on a continuous edge map from said outer edge intensity map, wherein said plurality of paths on said continuous edge map is created by connecting pixels in said outer edge intensity map; and
   forming an edge mask by selecting one path on said continuous edge map from said plurality of paths on said continuous edge map, wherein said selecting is based on a highest average edge intensity.

19. The computer system as described by claim 18, wherein said generating said plurality of paths on said continuous edge map comprises:
   searching for a first pixel at a row of said outer edge intensity map that has an intensity greater than a threshold;
   identifying a next pixel from a plurality of pixels, wherein said plurality of pixels is within a certain distance from said first pixel, and wherein said next pixel has an intensity value greater than other pixels within said plurality of pixels;

increasing said certain distance to create a new distance if said next pixel is unidentifiable and repeating said identifying using said new distance;

selecting said next pixel as a pixel in said continuous edge map; and repeating said searching, said identifying, said increasing, and said selecting to form said plurality of paths on said continuous edge map.

20. The computer system as described by claim 18, wherein Sobel filters are used to generate said outer edge intensity map or an orientation edge map is used to generate said outer edge intensity map.

* * * * *